May 16, 1933.        H. SCHWARZE        1,909,077
VEHICLE LIGHTING ARRANGEMENT
Filed March 31, 1930
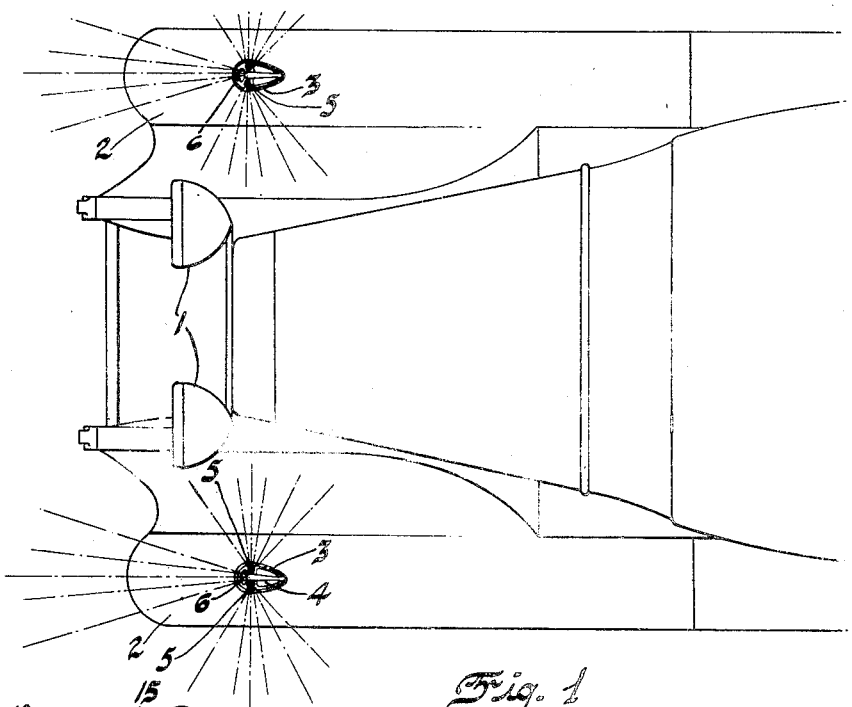
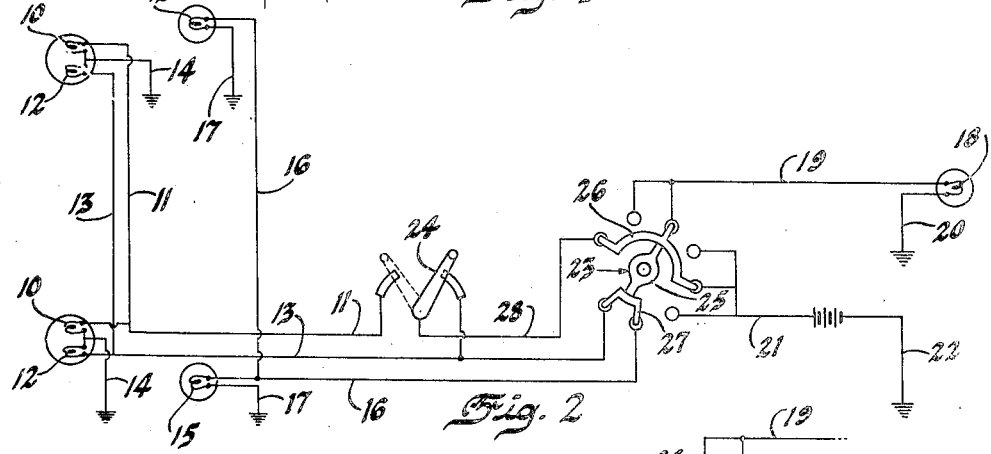
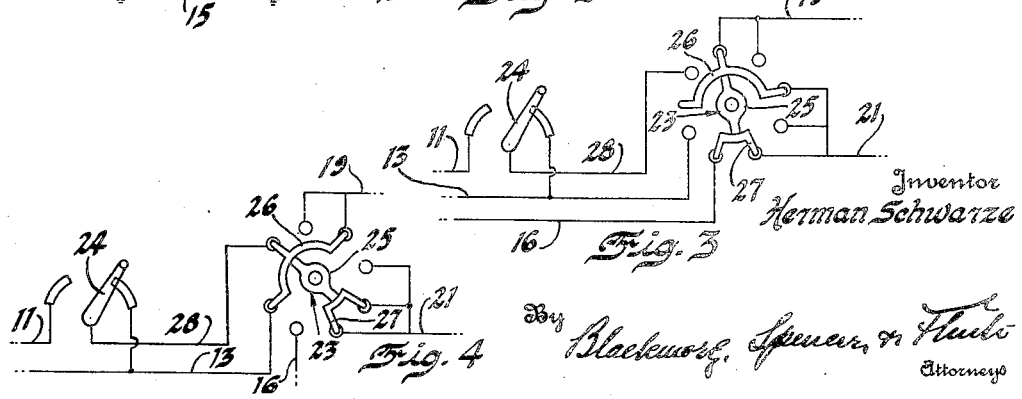

Patented May 16, 1933

1,909,077

UNITED STATES PATENT OFFICE

HERMAN SCHWARZE, OF BIRMINGHAM, MICHIGAN

VEHICLE LIGHTING ARRANGEMENT

Application filed March 31, 1930. Serial No. 440,481.

This invention relates generally to an improved lighting arrangement for vehicles, and more particularly to a novel circuit and switch arrangement primarily adapted for use with auxiliary lights such as the fender lamps disclosed and claimed in application S. N. 440,454, filed March 31, 1930 in the joint names of Clarence A. Michel and Herman Schwarze.

The fender lamps, as are disclosed more fully in said copending application, are constructed and designed so as to show a light forwardly, to the sides and slightly to the rear thereof, and when positioned on the vehicle front fenders and operated in accordance with the lighting circuit disclosed and claimed herein, function as a decided aid to safety in night driving.

In the embodiment of my invention forming the subject of this application, the car lighting circuit is so arranged that the fender or other auxiliary lamps may be employed in conjunction with the usual tail lamp for parking, and in city driving or when passing other vehicles will be lighted preferably in conjunction with the so-called "passing beam" which may consist of the lower headlight beam in arrangements employing two-filament headlight bulbs, the dim headlight beam in arrangements employing a resistance in the headlight circuit, or in other arrangements wherein there is provided a "driving beam" of one character or location for normal driving and a "passing beam" of a different character or location for city driving and/or when passing other vehicles to avoid objectionable glare. It will be understood within the scope of my invention that it might be desirable under some circumstances to use the auxiliary or fender lamps in conjunction with the "driving beam", though there appears to be added advantages in the preferred use with the "passing beam" and particularly as employed with the structure and location of the fender lamps disclosed herein and in the co-pending application heretofore identified.

With only the conventional headlights it is often practically impossible to see a car directly ahead which is emerging from a side street by reason of the fact that the lamps thereof are focused straight ahead, whereas by the provision of my improved lamps a light is directed from the sides of the car in position to be readily visible to drivers of cars approaching on side or intersecting streets. When a car provided with fender lamps is either parked or proceeding with the headlight passing beam, such lamps function as "markers" to the on-coming drivers by defining the width of the car. Furthermore, the fender lamps serve as an indication to the driver as to whether his headlights are properly conditioned to provide the passing beam in city driving or when approaching on-coming cars.

Preferably, as will be disclosed more fully hereinafter, the lighting circuit is combined with two switches. A primary, hand-operated switch functions in three operating positions to open the lighting circuit in the off-position, establish electrical connections to the fender lamp and tail lamp in the parking position, and establish connections to the headlights and tail lamp in the driving position. A secondary, preferably foot-operated switch functions in conjunction with the driving position of the primary switch to complete the circuits to the headlights to provide the driving beam in one position, and to depress, dim or otherwise alter the beam to provide the passing beam and complete the circuits to the fender lamps in another position.

In the drawing forming a part hereof,

Figure 1 is a diagrammatic top plan view of the front portion of a vehicle embodying the auxiliary fender lamps.

Figure 2 is a diagram of the circuit and switch arrangement.

Figures 3 and 4 illustrate further switch positions in the lighting circuit.

Referring first to Figure 1, there is illustrated the front portion of a motor vehicle, including the conventional engine hood, main headlights, and front fenders. The headlights 1 are positioned between the longitudinally curved front fenders 2 on which are mounted the auxiliary lamps 3. As more fully disclosed in the copending application referred to hereabove, the auxiliary lamps may include a means to prevent passage of light directly to the rear but permit the projection of rays forwardly, to the sides and slightly to the rear. In the embodiment shown herein this means consists of a metal shield 4 formed with side openings 5 and a front opening 6 effectively preventing passage of light except through such openings.

The paths of the light rays from the fender lamps have been diagrammatically indicated by the dash lines in Figure 1 and on reference thereto it will be noted that the rays directed forwardly from the fender lamps will serve as an indication to oncoming drivers of the approximate width of the vehicle, while the rays directed toward the outer sides of the vehicle provide an indication to drivers or pedestrians on either side of the vehicle, and in conjunction with the rays directed from the inner sides and slight rearwardly of the lamps provide an indication to the driver as to the relative position of the secondary headlight beam control switch.

The lighting circuit, as illustrated in Figures 2, 3 and 4 includes double filament headlight bulbs of conventional form for obtaining an upper and lower beam, whereas the circuit may readily be adapted for operation with headlights having other arrangements to provide a driving and a passing beam. The circuit includes the headlight filaments 10 for obtaining the upper beam with lead wires 11, the filaments 12 for the lower beam with lead wires 13, and ground wires 14, the fender or side lamp filaments 15 with lead wires 16 and ground wires 17, the rear or tail lamp filament 18 with lead wire 19 and ground wire 20, and the usual battery with connecting wire 21 and ground wire 22.

Two switches are incorporated in the circuit, namely, a primary or hand-operated lighting switch 23 and a secondary or headlight beam control switch 24, which is preferably adapted to be foot-operated. Diagrammatically, the switch 23 consists of an insulated intermediate arm 25 mounted for rotation by means of a suitable operating handle or the like, and contact sectors at opposite ends thereof, the sector 26 being provided with three contact portions and the sector 27 with two contact portions, which portions are adapted to contact on rotation of the switch with various stationary contacts arranged and connected in the manner clearly shown in Figure 2. The switch 24 is connected by wire 28 with one of the above-mentioned stationary contacts and is pivotally mounted so as to contact with either of two stationary contacts, one connected to wire 11 and the other to wire 13. It is believed that the wiring arrangement will be more obvious without confusing the drawing with additional reference numerals, by tracing the circuits for the various positions of the switches 23 and 24.

Referring first to Figure 2, when the switch 24 is in the full line position, current from the battery passes through wire 21, sector 26 of switch 23, wire 28, switch 24, wire 13, and filaments 12 to ground 14; also through sector 26, wire 19, and filament 18 to ground 20; and from wire 13 through sector 27 of switch 23, wire 16, and filaments 15 to ground 17. In this position of the switches, the fender or side lamps are lighted in conjunction with the lower headlight beam and the rear or tail lamp.

By moving the switch 24 to the dotted line position shown in Figure 2, the circuit between the wire 28 and wire 13 is opened, and the circuit closed between wire 28 and wire 11 leading to the headlight filaments 10, thereby shifting from the lower headlight beam to the upper headlight beam and cutting out the fender or side lamps, retaining the same circuit as above to the rear or tail lamp.

In Figure 3, the switch 23 has been rotated counter-clockwise from the position shown in Figure 2, completing the circuits from the battery through wire 21, sector 26, and wire 19 to the filament 18 of the rear or tail lamp, and through sector 27 and wire 16 to filaments 15 of the fender or side lamps, thereby providing the so-called parking position. In Figure 4, the switch 23 has been rotated further counter-clockwise to the off-position wherein no circuits are closed and no lamps illuminated.

From the foregoing it will be perceived that I have designed a lighting circuit and switch arrangement which is particularly adapted for use with fender lamps of the type disclosed. Although described with reference to use with fender lamps so constructed as to provide the various indications with attendant advantages set forth heretofore, it is believed that certain features of my invention are both novel and desirable for use with other types of auxiliary lights, and I contemplate therefore, all such uses, changes and modifications as come within the scope of the invention as defined by the appended claims.

I claim:

1. In a car lighting system, an electric current supply source, headlights, auxiliary lights, and a tail light, a circuit and switching arrangement comprising a primary switch and a secondary switch with conductors connecting said supply source to said lights through said switches, said primary switch functioning in different operating positions to complete circuits, respectively, to said secondary switch and tail light, or to said auxiliary lights and tail light, and said secondary switch functioning in different operating positions to complete circuits, respectively, from said primary switch to said headlights or to said headlights and auxiliary lights.

2. The arrangement of claim 1, in which said headlights provide a driving and a passing beam, and said secondary switch in the one position completes circuits for the driving beam, and in the other position completes circuits for the passing beam and circuits to said auxiliary lights.

3. A car lighting system including a source of current supply, headlights providing a driving and a passing beam, auxiliary lights, and means to control said lights comprising conductors from said supply source, a primary control means conditioning the system for operation of said headlights and a secondary control means conditioning said headlight operation to provide either the driving or the passing beam and illuminating said auxiliary lights in conjunction with one of said beams.

4. In a car lighting system, an electric current supply source, a headlight having separate filaments to provide an upper and a lower beam, an auxiliary light, a tail light, conductors connecting said supply source to said lights, and a primary switch and a secondary switch interposed in said connections, said primary switch having three operating positions, the first being an off-position, the second completing circuits to the auxiliary light and tail light, and the third completing circuits to said secondary switch and tail light, and said secondary switch having two operating positions, one completing circuits to the filament for the upper beam of said headlight and the other completing circuits to the filament for the lower beam of said headlight and to the auxiliary light.

5. The combination with bright and dim head light circuits and an auxiliary light circuit, of a first switch provided with a current supply connection, a head light terminal, an auxiliary light terminal and a shunt terminal, and a contactor movable to a first position for supplying current from said connection to said auxiliary supply terminal and in its second position to supply current from said connection to said head light terminal while independently connecting said auxiliary light terminal and shunt terminal; a second switch connected with said head light supply terminal and energized thereby in the second position of said first switch, said second switch being provided with terminals connected with the respective head light circuits and a contactor selectively energizing said circuits alternatively; together with a conductor connecting said dim head light circuit with the shunt terminal of said first switch, whereby to energize said auxiliary light circuit and shunt said dim head light circuit while insuring the de-energization of said dim head light circuit in the first position of said first switch.

6. The combination with first and second circuits and a selector switch for delivering such current alternatively to either of said circuits, of a control switch having a current supply circuit and a plurality of current delivering circuits and a shunt current receiving circuit conneted with said first circuit, together with contacting means selectively operable to connect said supply circuit alternatively with either of said delivery circuits and connecting one of said delivery circuits with said shunt receiving circuits only when said current supply means is connected to the other of said delivery circuits, said other delivery circuit being electrically connected with said selector switch.

7. In an electric lighting system, the combination with a tail, side and head lamps, said head lamp having a "bright" and "dim" connection; a source of current; circuit connections therebetween; a main switch for controlling said tail, side and "bright" circuit connections; a supplemental switch having a connection with said "bright" circuit, said switch being manually operated to open said "bright" circuit and close the "dim" circuit and to concurrently close the side lamp circuit.

8. In an electric lighting system, the combination with a plurality of independent sets of lamps, an electrical source; circuit connections therebetween; a switch for controlling the opening and closing of each of said circuits to said lamps; a supplemental circuit included in one of said lamp circuits; and a manually operated switch for closing said supplemental circuit to open a closed circuit of a lamp and close said supplemental circuit with said mentioned lamp and simultaneously closing a circuit to another lamp.

9. In a lighting system, the combination with a plurality of lamps having circuit connections; a main switch controlling the opening and closing of a circuit to each of said lamps; and a supplemental switch controlling a separate circuit connection with a head lamp, said supplemental switch manually operated to open a circuit made by the main switch to said head lamp and close said separate circuit of said head lamp and close another circuit to a lamp left open by said main switch.

10. In an electric lighting system for vehicles, the combination with a source of current; independent head, tail and side lamps, having circuit connections with said source of current; a switch for controlling said circuit connections; a manually operated switch included in the head lamp circuit, said switch operable to open a closed circuit to said head lamp and close an open circuit to said head and side lamps.

11. In an electric lighting system, the combination with a plurality of independent lamps, a source of electrical energy, independent circuit connections therebetween, one of said lamps having a bright and dim circuit connection; a main switch for controlling a circuit connection to each of said lamps; a supplemental switch having a circuit connection with said main switch and manually operated to open the bright connection of the lamp and close the dim connection of the same lamp and connect another lamp circuit left open by said main switch.

In testimony whereof I affix my signature.

HERMAN SCHWARZE.